United States Patent [19]

Fujimoto et al.

[11] 4,155,893

[45] May 22, 1979

[54] PREPARING A HYDROPHILIC GEL BY HYDROLYZING A VINYL ESTER-ACRYLIC OR METHACRYLIC ESTER COPOLYMER

[75] Inventors: Masanori Fujimoto, Ibaraki; Toshifumi Tamura; Tsuneyuki Nagase, both of Takatsuki, all of Japan

[73] Assignee: Sumitomo Chemical Company, Limited, Osaka, Japan

[21] Appl. No.: 841,910

[22] Filed: Oct. 13, 1977

[30] Foreign Application Priority Data

Oct. 18, 1976 [JP] Japan .................................. 51-125296
Feb. 25, 1977 [JP] Japan .................................. 52-20748

[51] Int. Cl.$^2$ ......................... C08F 8/12; C08L 29/02
[52] U.S. Cl. .............................. 260/29.6 H; 128/284; 260/29.6 TA; 260/29.6 B; 260/32.6 R; 260/32.8 R; 260/33.4 R; 260/33.6 UA; 521/31; 521/32; 526/7; 526/9; 526/10; 526/11; 526/328; 526/329

[58] Field of Search .................... 526/10; 260/29.6 B, 260/29.6 H

[56] References Cited

U.S. PATENT DOCUMENTS

| 2,328,922 | 9/1943 | Neher et al. .......................... 526/10 |
| 2,467,774 | 4/1949 | Plambeck ............................. 526/10 |

FOREIGN PATENT DOCUMENTS 2318881  7/1976  France.

*Primary Examiner*—Stanford M. Levin
*Attorney, Agent, or Firm*—Cushman, Darby & Cushman

[57] ABSTRACT

A method for the preparation of water-insoluble gels containing at least a hydroxyl group and a carboxylate group in molecules thereof which comprises saponifying copolymers comprising a vinyl ester component and an acrylic or methacrylic acid ester component or terpolymers comprising said two components and an ethylene component in the presence of an alkali catalyst and a solvent under conditions in which said copolymers or terpolymers are not dissolved.

29 Claims, No Drawings

PREPARING A HYDROPHILIC GEL BY HYDROLYZING A VINYL ESTER-ACRYLIC OR METHACRYLIC ESTER COPOLYMER

The present invention relates to a method for the preparation of water-insoluble, hydrophilic gels having an ability to absorb a large amount of water.

As application of hydrophilic polymer materials to the medical industry, food industry or agricultural fields has recently advanced, water-insoluble and hydrophilic or water-absorbing polymeric material have begun to be used as materials for separation and purification such as various membranes and carriers for liquid chromatography, as enzyme supporting materials, as culturing materials for microorganisms or plants, and medical materials such as contact lens and suture-protective materials; such as materials requiring water absorbability and water retentivity. Among those uses, particularly in the application fields which make use of water absorbability and water retentivity, it is desired for the polymer materials to absorb as large an amount of water as possible in a short period of time when they are brought into contact with water. The well-known methods for the preparation of such polymeric materials are, for example, crosslinking of water-soluble polymers with a crosslinking agent, or modifying the water-soluble polymers to water-insoluble ones by partial substitution of the hydrophilic groups with hydrophobic ones. In the crosslinking above, degrees of crosslinking and water-absorbing ability are opposed to each other.

Hitherto, there have been proposed several materials which are made of natural or synthetic polymer substances, for example crosslinked products of polyethylene oxide, polyvinyl pyrrolidone, sulfonated polystyrene, or sodium polyacrylate; cellulose derivatives; and saponified products of starch-acrylonitrile graft copolymers. However, with the exception of the saponified products of starch-acrylonitrile graft copolymer, these materials are low in the water-absorbing ability and unsatisfactory as a water-absorbent material. The saponified products of starch-acrylonitrile graft copolymers, however, have a number of drawbacks in that, for example, methods for preparing the same, even after various improvements have been made, are relatively troublesome and, when they are used in hydrated state for a long time, the starch component rots and the gel structure is broken. The term "hydrated" referred to herein means "contain water" hereinafter.

Hitherto, it is well known that copolymers comprising ethylene, a vinyl ester and a (meth)acrylic acid ester in certain proportions or saponified products thereof are used as water-soluble adhesives or plastic materials of low gas-permeability. But, it is not known that water-insoluble, highly water-absorbent hydrophilic gels are obtained from these copolymers.

As a result of the extensive studies with attention given to the subjects described above, the inventors previously found that copolymers comprising a vinyl ester and an ethylenically unsaturated carboxylic acid or derivative thereof, or copolymers comprising said two components and ethylene can be converted to water-insoluble hydrophilic gels having excellent properties by saponifying the copolymers to water-soluble copolymer salts and drying the aqueous solutions of the salts until the water content of the salts is reduced to less than a certain value.

Said invention is characterized in the following points: The saponified products of the copolymers are modified to water-insoluble matters without a treatment with a crosslinking agent and moreover the matters rapidly swell in water, showing an ability to absorb such large an amount of water as several hundred times as much as their own weight; and their aforesaid drawbacks at a dry state are improved to an extreme extent.

As a result of further improvements in the method for preparing the hydrophilic gels comprising the foregoing copolymer group, the inventors found a method for preparing water-insoluble, highly water-absorbent hydrophilic gels, through not a special gelation (or insolubilization) process but a simple saponification process, from copolymers comprising a vinyl ester and an acrylic (or methacrylic) acid ester or terpolymers comprising said vinyl ester and acid ester and ethylene as a starting material.

An object of the present invention is to provide a method for the preparation of water-insoluble hydrophilic gels having an ability to absorb a large amount of water with a high efficiency.

That is to say, in the preparation of hydrophilic gels comprising a high-molecular copolymer containing at least a hydroxyl group and a carboxylato group in molecules thereof, the present invention provides a method for the preparation of water-insoluble hydrophilic gels characterized in that copolymers comprising a vinyl ester component (X) and an acrylic or methacrylic acid ester component (Y) in the range of molar ratio, $$X:Y = 20:80 \text{ to } 80:20$$

or terpolymers comprising (X) and (Y) components and an ethylene component (Z) in the range of molar ratio, $$X:Y = 20:8: \text{ to } 80:20$$

$$Z:(X+Y) = 0.1:99.9 \text{ to } 15:85$$

are saponified in the presence of an alkali catalyst and a solvent under conditions in which said copolymers or terpolymers are not dissolved.

According to the present invention, a preparation process for the hydrophilic gels is simplified and, in particular, the process is extremely advantageous in the commercial production of spherical or fibrous hydrophilic gels. Furthermore, the hydrophilic gels obtained by the method of the present invention have excellent transparency, no coloration and, in general, a water-absorbing ability of more than ten times as much as their own weight. Also, they are stable even in a state wherein they contain as much water as several hundred times. Particularly, the gels from the terpolymers retain excellent flexibility even in a dry state so that they may be said to be extremely useful in the fields of application described hereinafter.

The present invention will be explained in detail.

The copolymers or terpolymers used in the present invention can be prepared by any well-known method. In general, they are synthesized by solution polymerization, emulsion polymerization or radical polymerization by the suspension polymerization process. The composition of said copolymers or terpolymers exerts a large effect on the water-absorbing ability of the hydrophilic gels obtained by the method of the present invention. Consequently, in order to obtain the hydrophilic gels as intended by the present invention, it is necessary to fix the composition of the copolymers or terpolymers before saponification to the following ranges: For the copolymers comprising a vinyl ester component (X) and an acrylic or methacrylic acid ester component (Y), the molar ratio of X to Y is the range of X:Y=20:80 to 80:20; and for the terpolymers comprising (X), (Y) and an ethylene component (Z), the molar ratios among X, Y and Z are in the range of X:Y=20:80 to 80:20 and Z:(X+Y)=0.1:99.9 to 15:85.

In either case, when the proportion of Y is smaller than the above-described range, the water-absorbing ability of hydrophilic gel is extremely low, while too large proportions of Y lower the gel strength in a hydrated state. A preferred molar ratio of X to Y is generally 30:70 to 70:30, more preferably 40:60 to 60:40.

In the case of the terpolymers, an increased proportion of the ethylene component (Z) increases the flexibility of the gel in a dry state. When the proportion however exceeds the foregoing limit, the water-absorbing ability is extremely reduced and no longer suitable for the objects of the present invention. A preferred molar ratio of Z to (X+Y) is generally 1:90 to 10:90, more preferably 3:97 to 7:93. Further, preferred copolymers or terpolymers (referred to as "copolymers" generically hereinafter) are those having an intrinsic viscosity in benzene of at least 1.0, preferably at least 1.5.

As the vinyl ester used for the preparation of said starting copolymers, there may be given vinyl esters of $C_2$-$C_{18}$ saturated carboxylic acids, for example vinyl acetate, vinyl propionate and vinyl stearate. Among them, vinyl acetate is preferred in general. As the acrylic (or methacrylic) acid ester, there may be given alkyl esters, particularly $C_1$-$C_4$ alkyl esters, of acrylic or methacrylic acid, for example methyl, ethyl, n-propyl, iso-propyl, n-butyl and t-butyl esters. Among them, methyl acrylate and methyl methacrylate are particularly preferred.

The high water-absorbent, hydrophilic gels intended by the present invention are obtained by saponifying the foregoing copolymers in the presence of an alkali catalyst and a solvent under conditions in which the copolymers are not dissolved.

The solvent used for the saponification includes water-alcohol mixtures. In the method of the present invention, the foregoing starting copolymers are saponified in a state wherein the copolymers swell in the solvent and disperse therein. But the solvent largely affects the the gel-forming property and water-absorbing property of the saponified product, even though the saponification degree is constant. For example, when the saponification is carried out with varying compositions of the water-alcohol mixture, the amount of water absorbed in the hydrophilic gel increases in general with an increase in the water content of the mixture. But when the water content exceeds a certain proportion, it is no longer possible to obtain the water-insoluble, highly water-absorbent gels as intended by the present invention.

The amount and composition of the saponification solvent depends somewhat upon the component and composition of the starting copolymers. In general, the amount of the solvent is within the range of 300 to 10,000 parts by weight based on 100 parts by weight of said copolymers, preferably 500 to 2,000 parts by weight. Also, the composition of the solvent, i.e, the mixing proportion of water in the alcohol-water mixtures is within the range of 0.01 to 40% by weight, preferably 5 to 30% by weight. As the alcohol, there may be given $C_1$-$C_4$ alkyl alcohols. Among them, methanol is most preferred.

As the alkali catalyst used for the saponification, the well-known alkali catalysts are used. Particularly, alkali metal hydroxides such as sodium hydroxide and potassium hydroxide are preferred. The amount of alkali catalyst used depends upon the composition of solvent used, but in general it is 0.5 to 2 times by mole, preferably 1 to 12 times by mole, based on the vinyl ester component and the acrylic or methacrylic acid ester component in said copolymers.

The saponification usually comes to an end in 2 to 10 hours in the range of 20° to 80° C. But the following point is important in the saponification according to the present invention: In the saponification under the above-described conditions, it is necessary to maintain the conditions so that the copolymers are not dissolved in the saponification solvent at any step throughout the saponification process.

The aforesaid starting copolymers are insoluble in water, while their solubility in alcohol varies with the kind of alcohol and their composition. For example, in the case of the copolymers comprising ethylene, vinyl acetate and methyl acrylate, those having a low proportion of methyl acrylate are easily soluble in methanol, while those having a high proportion of methyl acrylate become sparingly soluble in methanol. Even the latter copolymers, however, fairly increase in the solubility by heating. In the practice of the present invention, therefore, it is desirable to use the water-alcohol solvent having the aforesaid composition range and at the same time to start the saponification at a low temperature, preferably at 20° to 30° C., in order to prevent the copolymers from being dissolved in the solvent at the beginning of the saponification, and then, after the saponification proceeds to some extent and the solubility of the copolymers in the solvent disappears, to elevate the reaction temperature. Such conditions are properly determined with ease by the skilled in the art.

On the other hand, the saponification proceeds even when water is used as a saponification solvent, but in this case the copolymers dissolve in water with the progress of the saponification. Consequently, the hydrophilic gels as intended by the present invention can not be obtained.

In the practice of the present invention, the shape of the starting copolymers before saponification is not particularly limited. By using the starting copolymers having a spherical, fibrous or powdery form or any other form according to the purposes of use, the hydrophilic gels having the corresponding form can be obtained. But, the particularly preferred embodiment of the present invention is a method to obtain spherical or fibrous hydrophilic gels. In order to obtain the spherical hydrophilic gels, it is desirable to obtain the starting copolymers by suspension polymerizaton. The particle size of the copolymers is not particularly limited, but it is within the range of about 10μ to about 2,000μ in general.

Further, in order to obtain the fibrous hydrophilic gels, the starting copolymers shaped into a fibrous form by the well-known arts such as melt spinning and solution spinning are used.

It is necessary for the hydrophilic gels intended by the present invention to have at least a hydroxyl group and a carboxylato group in molecules thereof. Consequently, the saponification degree may have any value so far as the above-described requirements are satisfied.

In order to obtain water-insoluble, highly water-absorbent hydrophilic gels, however, the saponification degrees of the vinyl ester component and the acrylic or methacrylic acid ester component in said copolymers are 50 mole % or more, preferably 90 mole % or more, and 30 mole % or more, preferably 70 mole % or more, respectively.

The carboxylato groups in the hydrophilic gels obtained by the method described above form a salt together with the alkali substance used as the saponification catalyst. But the form of the salt may optionally be changed by the well-known methods. For example, the hydrophilic gels of an alkali metal salt type may be changed to those of an organic amine salt type by the ion exchange process. Further, hydrophilic gels having two or more forms of salt may be produced by carrying out the saponification in the presence of two or more kinds of alkali substance. As the conventional salt-forming substance, there may be given alkali metal hydroxides (e.g. sodium hydroxide and potassium hydroxide), ammonium hydroxide, mono-, di- and tri-methylamine, mono-, di- and tri-ethylamine, mono-, di- and tri-isopropylamine, mono-, di- and tri-ethanolamine, mono-, di- and tri-isopropanolamine, N,N-dimethylethanolamine, N,N-dimethylisopropanolamine, N,N-diethylethanolamine, N,N-diethylisopropanolamine, N-methlethanolamine, N-methylisopropanolamine, N-ethylethanolamine, cyclohexylamine, benzylamine, aniline, pyridine and other organic amines. Preferred examples of the alkali substance are sodium hydroxide, potassium hydroxide, ammonium hydroxide and aliphatic amines.

When the present hydrophilic gels form a salt together with an alkaline earth metal such as magnesium or calcium, the water-absorbing ability of the gels is extremely reduced. Consequently, such the gels are not suitable as highly water-absorbent gels. But, when they are used as a mixture with the gels of the foregoing salt type, multi-valent metals may also be used.

As described first, the present hydrophilic gels thus obtained generally have an ability to absorb water of more than ten times as much as their own weight. When water to be absorbed contains a substance, however, the ability varies in general with the kind and amount of the substance. For example, referring to the ability to absorb water having different pH values, the gels have the highest ability when the pH of water is 8 to 10, absorbing water of more than 500 times as much as their own weight. The ability reduces as the pH value is far away from this range, particularly remarkably so at a pH of 5 or less. But the water-absorbing ability once lost in an acidic water can be recovered in full, when the gel is transferred from the acidic liquor to an alkali liquor. Further, highly hydrated gels release a large amount of water when a salt such as sodium chloride is added to the gels. In other words, the gel shows a water absorption/water release reversible change depending upon the pH value and the salt concentration of water.

As described above, the hydrophilic gels of the present invention are used as a particularly suitable water-absorbent material when water to be absorbed has the pH range of 5 to 12. The water-absorbing ability of the gels may optionally be changed by changing the composition and component of the starting copolymer, the degree of saponification and the composition of the saponification solvent.

The hydrophilic gels of the present invention are useful as an absorbent material which absorbs not only water but also other liquids. For example, when the gels are of an organic amine salt type, they exhibit an excellent absorbing ability even for mixed solvents of water and an organic solvent, for example water-alcohol and water-acetone. Thus, it is also possible to obtain hydrophilic gels having various grades of absorbing ability by properly selecting the form of salt.

The hydrophilic gels of the present invention have the following advantages.

Firstly, the hydrophilic gels are transparent, less colored, almost non-toxic as easily assumed from the molecular structure and highly flexible even in a dry state. Therefore, they are expected to be usable without problems in the fields of application wherein contact between the gels and the human body is not avoidable, for example medical supplies such as disposable diapers, tampons, sanitary cotton, bandages and napkins. Secondly, there is no fear of the gels rotting, even when they are used in a hydrated state for a long time. Consequently, they are preferably used for industrial uses such as a water-absorber for water-containing oils, other dehydrating agents and drying agents, and for a carrier for chromatography, a water-retaining agent for plants and soils and other uses requiring water absorbency and water retentivity. Thirdly, the gels are prepared very easily on a industrial scale and further they can be molded into optional shapes depending upon the intended use. For example, spherical hydrophilic gels and fibrous ones are particularly preferably used as carriers and medical supplies, respectively. Further, according to the purposes of use, the fibrous or spherical gels can be molded into film by crushing the gels in a hydrated state and applying the spreading process.

The present invention will be illustrated in more detail with reference to the following examples, which are not intended to limit the present invention thereto.

The water absorption percentage or absorption percentage in the examples is defined as follows:

$$\text{Water absorption ability (Absorption ability)} = \frac{\text{weight of gel after absorption (g)}}{\text{weight of dry gel (g)}}$$

EXAMPLE 1

A mixture of 60 g of vinyl acetate, 40 g of methyl acrylate and 0.5 g of benzoyl peroxide as a polymerization initiator was dispersed in 300 ml of water containing 3 g of partially saponified polyvinyl alcohol as a dispersion stabilizer and 10 g of sodium chloride. Then, suspension polymerization was carried out at 65° C. for 6 hours. The copolymer obtained had a methyl acrylate content of 48 mole % and its intrinsic viscosity in benzene was 2.10 at 30° C.

Next, 8.6 g of the copolymer thus obtained was suspended in a saponification liquor comprising 200 g of methanol, 10 g of water and 40 ml of 5N sodium hydroxide aqueous solution. Saponification was carried out at 25° C. for 1 hour and then at 65° C. for 5 hours. After the saponification was finished, the reaction product was thoroughly washed with methanol and dried under reduced pressure to obtain 6.8 g of a dry, spherical saponified product of 20μ to 200μ in particle size.

Said saponified product had a saponification degree of 98.3 mole % and showed a strong absorption of —COO$^-$ at 1570 cm$^{-1}$ in the IR absorption spectrum.

The spherical saponified product thus obtained was insoluble in water, rapidly swelled in water and absorbed de-ionized water at a rate of 750 g/g.

In a state wherein the saponified product absorbed 750 g of de-ionized water per g of product, the product had excellent transparency and gel strength, and it was kept stably, with its spherical gel form unchanged, in excess water for a long period of time.

EXAMPLE 2

The spherical hydrophilic gel obtained in Example 1 was added to excess water and dilute sulfuric acid was added thereto to make the pH 2. The gel was markedly shrunk at that time and deposited after a while. The precipitate was then isolated, thoroughly washed with water and dried under reduced pressure.

This isolated product still maintained its original spherical form, but it was found from IR absorption spectrum that the absorption of —COO⁻ had already disappeared and instead thereof a strong absorption of a carbonyl group suggesting the presence of an acid and ester group was observed in the region ranging from 1700 to 1800 cm$^{-1}$.

Next, the isolated product was suspended in water and tri-ethylamine was added thereto. The product began to swell, with its spherical form unchanged, as the triethylamine was added.

This system was allowed to stand overnight with its pH maintained at about 10 by the addition of triethylamine, and thereafter it was filtered to remove excess water. The gel in a swollen state was shrunk by placing it in a large amount of isopropanol and dried under reduced pressure. Thus, a spherical dry gel was again obtained.

The IR absorption spectrum of this hydrophilic gel showed again a strong absorption of —COO⁻, which suggests that this gel is of a triethylamine salt type.

The thus obtained spherical hydrophilic gel of a tri-ethylamine salt type is insoluble not only in water but also in methanol and water-alcohol mixtures, and has an excellent absorption ability (Table 1).

Table 1

| Liquid to be absorbed | Absorption ability (g/g) |
|---|---|
| Water | 400 |
| Methanol | 95 |
| Water-methanol mixture (water content 20%) | 260 |
| Water-ethanol mixture (water content 20%) | 150 |
| Water-isopropanol mixture (water content 20%) | 45 |

EXAMPLE 3

An acetone solution of a vinyl acetate/methyl acrylate copolymer (intrinsic viscosity in benzene, 1.95 at 30° C.; methyl acrylate content, 51 mole %) was spun and cut into short fibers of 10 mm long and 10μ in diameter.

Next, 8.6 g of said fibers was suspended in a saponification liquor comprising 200 g of methanol, 15 g of water and 40 ml of 5 N sodium hydroxide aqueous solution. Saponification was carried out at 25° C. for 1 hour and then at 65° C. for 5 hours.

After the saponification was finished, the reaction product was thoroughly washed with methanol and dried under pressure to obtain 7.1 g of a fibrous saponified product.

Said saponified product had a saponification degree of 97.5 mole % and showed a strong absorption of —COO⁻ at 1570 cm$^{-1}$ in the IR absorption spectrum.

The fibrous saponified product was insoluble in water, rapidly swelled in water and absorbed de-ionized water at a rate of 1,100 g/g. Further, the product was kept stably, with its fibrous gel form unchanged, in excess water for a long period of time.

EXAMPLES 4 to 6

300 ml of water containing 10 g of sodium chloride and 3 g of partially saponified polyvinyl alcohol as a dispersion stabilizer was charged into a polymerization vessel. Thereafter, a mixture of 60 g of vinyl acetate, 40 g of methyl acrylate and 0.5 g of benzoyl peroxide as a polymerization initiator was added to the aqueous solution to make a dispersion. After the air in the vessel was replaced with ethylene, ethylene was charged under pressure to 10 kg/cm² at 60° C. Then, suspension polymerization was carried out for 6 hours.

The composition of the copolymer obtained consisted of 46 mole % of methyl acrylate component, 49 mole % of vinyl acetate component and 5 mole % of ethylene component and its intrinsic viscosity in benzene was 2.45 at 30° C. in each of the solvents having the composition shown in Table 2, and saponification was carried out at this temperature for 1 hour, and then at 65° C. for 5 to 10 hours. After the saponification was finished, the reaction product was thoroughly washed with methanol and dried under reduced pressure to obtain a dry gel powder. The shape, solubility and water absorption ability of the gels obtained are shown in Table 2.

Table 2

|  | Composition of saponification liquor (g) | | | Saponification time at 65° C. (hr) | Saponification degree (mole %) | Shape of saponified product | Solubility in water | Water absorption ability (g/g) |
|---|---|---|---|---|---|---|---|---|
|  | methanol | water | NaOH |  |  |  |  |  |
| Example 4 | 200 | 20 | 8 | 5 | 93 | spherical | insoluble, swell with its spherical form unchanged | 450 |
| Example 5 | 200 | 40 | 8 | 5 | 92 | spherical |  | 600 |
| Example 6 | 150 | 60 | 8 | 5 | 92 | spherical |  | 820 |
| Reference | 100 | 100 | 8 | 5 | 94 | mixture of spherical | swells and | — |

Table 2-continued

| | Composition of saponification liquor (g) | | | Saponification time at 65° C. (hr) | Saponification degree (mole %) | Shape of saponified product | Solubility in water | Water absorption ability (g/g) |
| --- | --- | --- | --- | --- | --- | --- | --- | --- |
| | methanol | water | NaOH | | | | | |
| example 1 | | | | | | powder and amorphous powder | then dissolves | |
| Reference example 2 | 50 | 200 | 8 | 10 | 91 | amorphous powder | dissolves | — |

Note:
Any saponified product had a strong absorption of —COO⁻ in the IR absorption spectrum.

EXAMPLE 7

The spherical hydrophilic gel of a sodium salt type obtained in Example 5 was added to excess water and dilute sulfuric acid was then added thereto to make the pH about 2. At that time, the gel was shrunk and deposited.

Next, the precipitate was isolated, washed with water and re-suspended in water, and triethylamine was added thereto. The isolated product began to swell, with its spherical form unchanged, simultaneously with the addition of triethylamine. Triethylamine was added in an amount enough to maintain the pH of this system at 9 or more and the system was allowed to stand at that pH for 20 hours. Thereafter, excess water was removed, and the hydrophilic gel in a swollen state was shrunk by placing it in a large amount of isopropanol and dried under reduced pressure. Thus, a spherical dry gel was again obtained.

The hydrophilic gel thus obtained showed a strong absorption of —COO⁻ in the IR absorption spectrum, which suggests that this gel is of a triethylamine salt type.

The spherical hydrophilic gel was insoluble in all solvents and, as shown in Table 3, it had an excellent ability to absorb not only water but also methanol, water-alcohol mixtures and certain kinds of organic solvent.

Table 3

| Liquid to be absorbed | Absorption ability (g/g) |
| --- | --- |
| Water | 380 |
| Methanol | 65 |
| 20% Aqueous ethanol | 160 |
| Monoethanolamine | 70 |
| Ethylene glycol | 200 |
| Dimethylformamide | 40 |

EXAMPLE 8

An acetone solution of a terpolymer comprising 50 mole % of methyl acrylate, 43 mole % of vinyl acetate and 7 mole % of ethylene (intrinsic viscosity in benzene, 1.88 at 30° C.) was spun and cut into short fibers of 5 mm long and 10μ in diameter.

Next, 10 g of said fibers was dispersed at 20° C. in a mixed solvent of 40 g of water and 200 g of methanol containing 7 g of sodium hydroxide by dipping. Thereafter, saponification was carried out at 25° C. for 1 hour and then at 65° C. for 4 hours. The fibrous form was kept unchanged throughout the saponification.

After the saponification was finished, the reaction product was thoroughly washed with methanol and dried under reduced pressure to obtain 8 g of a fibrous saponified product. The saponification degree of said saponified product was 94 mole %.

The fibrous hydrophilic gel thus obtained was insoluble in water, absorbed water very rapidly thereby to swell and had a water absorption ability of 700 g/g.

As a reference example, a fibrous hydrophilic gel was prepared in the same manner as above except that a copolymer comprising 51 mole % of methyl acrylate and 49 mole % of vinyl acetate was used in place of the terpolymer. The fibrous gel obtained had a water absorption ability of 820 g/g, but it was very brittle and easily broken when handled at a dry state. While the present fibrous gel was not broken and had a very good handling.

What is claimed is:

1. A method for the preparation of a water-insoluble hydrophilic gel comprising a high - molecular weight copolymer containing hydroxyl groups and carboxylate groups in the molecule, which comprises saponifying a copolymer consisting essentially of a vinyl ester component (X) and an acrylic or methacrylic acid ester component (Y) in the range of the molar ratio, $$X:Y = 20:80 \text{ to } 80:20$$

or a terpolymer consisting essentially of (X) and (Y) components and an ethylene component (Z) in the range of the molar ratio, $$X:Y = 20:80 \text{ to } 80:20$$

$$Z:(X+Y) = 0.1:99.9 \text{ to } 15:85$$

in the presence of an alkaline catalyst and a solvent under conditions in which said copolymer or terpolymer is not dissolved, the saponification degree of the vinyl ester in said copolymer or terpolymer being 50 mole % or more and the saponification degree of the acrylic or methacrylic acid ester in said copolymer or terpolymer being 30 mole % or more.

2. A method according to claim 1 wherein the molar ratio of X to Y in said copolymer or terpolymer is in the range of 30:70 to 70:30.

3. A method according to claim 1 wherein the molar ratio of X to Y in said copolymer or terpolymer is in the range of 40:60 to 60:40.

4. A method according to claim 1 wherein said vinyl ester is a member selected from the group consisting of vinyl acetate, vinyl propionate and vinyl stearate.

5. A method according to claim 4 wherein the vinyl ester is vinyl acetate.

6. A method according to claim 1 wherein said acrylic or methacrylic acid ester is a member selected from the group consisting of methyl, ethyl, n-propyl, isopropyl, n-butyl and t-butyl esters of acrylic acid and methacrylic acid.

7. A method according to claim 6 wherein the acrylic or methacrylic acid ester is methyl acrylate or methyl methacrylate.

8. A method according to claim 1 wherein said solvent used for saponification is a mixture of water and alcohol having a water content of 0.01 to 40% by weight.

9. A method according to claim 8 wherein said water content is 5 to 35% by weight.

10. A method according to claim 8 wherein said alcohol is an alkyl alcohol having 1 to 4 carbon atoms.

11. A method according to claim 10 wherein the alcohol is methanol.

12. A method according to claim 1 wherein said alkaline catalyst is an alkaline metal hydroxide.

13. A method according to claim 12 wherein the alkaline catalyst is sodium hydroxide or potassium hydroxide.

14. A method according to claim 1 wherein the amount of alkaline catalyst is 0.5 to 2 times by mole based on the vinyl ester component and the acrylic or methacrylic acid ester component in the copolymer or terpolymer.

15. A method according to claim 14 wherein said amount of alkaline catalyst is 1 to 2 times by mole.

16. A method according to claim 1 wherein the saponification is carried out at 20° to 80° C.

17. A method according to claim 16 wherein the saponification is carried out at 20° to 30° C. at first and then at an elevated temperature.

18. A method according to claim 1 wherein said copolymer or terpolymer is of a spherical form.

19. A method according to claim 18 wherein the copolymer or terpolymer is that obtained by suspension polymerization.

20. A method according to claim 1 wherin said copolymer or terpolymer is of a fibrous form.

21. A method according to claim 1 wherein said saponification degree of the vinyl ester is 90 mole % or more.

22. A method according to claim 1 wherein said saponification degree of the acrylic or methacrylic acid ester is 70 mole % or more.

23. A method according to claim 8 wherein there is employed 300 to 10,000 parts by weight of solvent per 100 parts by weight of copolymer or terpolymer and the alcohol is an alkyl alcohol having 1 to 4 carbon atoms.

24. A method according to claim 23 wherein there is employed 500 to 2,000 parts by weight of solvent per 100 parts by weight of copolymer or terpolymer.

25. A method according to claim 8 wherein said water content is 5 to 30% by weight.

26. A method according to claim 24 wherein the water content in the solvent is 5 to 30% by weight and the saponification is carried out for 2 to 10 hours, the saponfication being carried out at first at 20° to 30° C. and then at a higher temperature up to 80° C.

27. A method according to claim 23 wherein the water content in the solvent is 5 to 30% by weight and the saponification is carried out for 2 to 10 hours, the saponification being carried out at first at 20° to 30° C. and then at a higher temperature up to 80° C.

28. A method according to claim 8 wherein the water content in the solvent is 5 to 30% by weight and the saponification is carried out for 2 to 10 hours, the saponification being carried out at first at 20° to 30° C. and then at a higher temperature up to 80° C.

29. A method according to claim 1 wherein the water content in the solvent is 5 to 30% by weight and the saponification is carried out for 2 to 10 hours, the saponification being carried out at first at 20° to 30° C. and then at a higher temperature up to 80° C.

* * * * *